Sept. 12, 1933.  E. J. SMITH  1,926,312
PRINTER'S ROLLER
Filed April 20, 1932
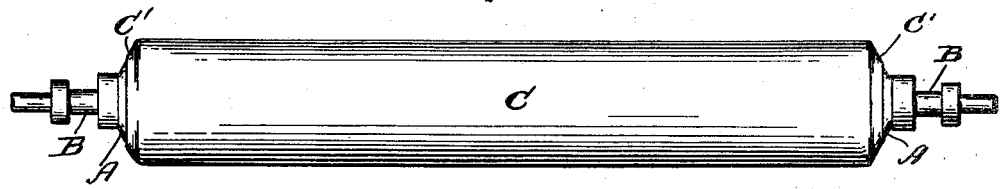
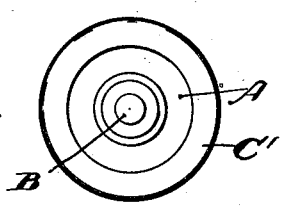 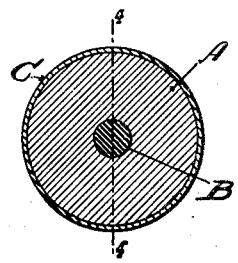
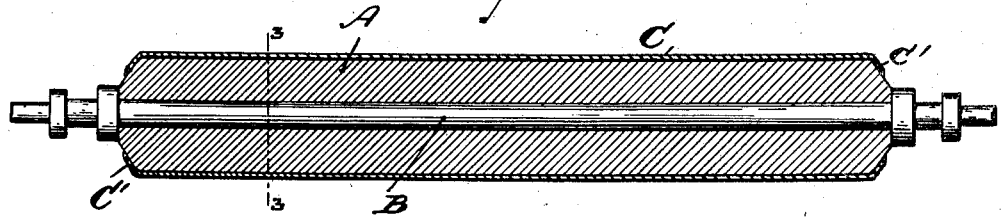
Ernest J. Smith  Inventor
By  S. E. Thomas
Attorney Patented Sept. 12, 1933

1,926,312

UNITED STATES PATENT OFFICE 1,926,312

PRINTER'S ROLLER

Ernest J. Smith, Detroit, Mich.

Application April 20, 1932. Serial No. 606,415

1 Claim. (Cl. 91—67.8)

My invention relates to printers' rollers and more particularly to rollers used on newspaper presses.

Printers' rollers have been and still are made of a composition consisting of glycerine, glue, molasses and other elements. Composition rollers however are quickly affected by variations in temperature and the heat generated through constant use of the roller also has a tendency to soften its composition, which soon loses shape thereby rendering the roller useless.

While composition rollers are still used,—particularly for half-tone and process color printing,—rubber rollers are now generally employed in the large newspaper offices throughout the country. Rubber rollers however harden and the surface soon becomes glazed and often swells through the action of printer's ink or contact with oil or other disintegrating substances, to which they are subjected when in use.

When rubber rollers swell and thereby lose alignment, poor printing is sure to result. It is therefore the usual practice,—in order to extend the life of the roller,—to grind and resurface its outer face or perimeter. To do this properly requires an elaborate outfit involving an expense running from $3000.00 to $5000.00. The machine also requires the services of an expert in this work at a considerable cost for labor;—but on the other hand if the rollers are returned to the factory, there is the factory charge for regrinding, plus freight and the inconvenience of having to wait probably a month before the rollers are returned.

It is therefore the purpose of the present invention to overcome these and other objectional features and to materially cut the cost of operation and servicing. With that end in view, a removable rubber tube of suitable gage is provided, which may be stretched that it may envelope the outer surface of the roller,—the tension being sufficient when in position to insure the tube against creeping either longitudinally or circumferentially.

The rubber tube may be removed and a new one mounted upon the roller in a few minutes and in the event of the rubber roller, or the core of the roller being swollen through use, the latter is ground to size before encircling it with the rubber tube or sleeve.

The rubber tube or sleeve may be of a composition that has a tendency to effectually resist the disintegrating action of printer's ink, oil or other elements which may contact therewith, or to penetrate or affect the tube;—but when worn, the tube is removed, and replaced by another.

With the foregoing and other objects in view which will appear as the description proceeds, the invention further resides in the details of construction hereinafter described and claimed, it being understood that changes may be made in the precise embodiment of the invention herein disclosed without departing from the spirit of the same.

In the drawing accompanying this specification:

Figure 1 is a side elevation of a printer's roller encased in the rubber tube.

Figure 2 is an end elevation of the roller showing the marginal edge of the inclosing tube overlapping the end of the roller.

Figure 3 is a cross-sectional view through the roller and tube, taken on or about line 3—3 of Figure 4.

Figure 4 is a longitudinal sectional view through the roller and tube, taken on or about line 4—4 of Figure 3.

Referring now to the letters of reference placed upon the drawing:

A denotes a printer's roller being slightly tapered at its ends, B the shaft on which the roller is mounted, C the rubber sleeve encircling the roller,—the marginal ends $C^1$, of the sleeve overlapping the ends of the roller. By this arrangement the tendency of the sleeve to slip upon the roller is overcome and further the sleeve fits snugly on the roller by frictional engagement and without the use of any added securing means.

It will be obvious that the roller or core A, may be either of rubber or any of the compositions usually employed for printers' rollers. The covering sleeve C is preferably made of a very smooth grade of rubber, the gage or thickness of which is substantially the same throughout its entire length, in order to provide a uniform printing surface.

I am aware that printers' rollers have been made with an outer surface which has been molded upon the core, or with wrappings which became integral with the core. My invention however consists in providing a removable tube sleeved over the core or roller, which may be removed when the latter shows signs of wear that it may be replaced by another sleeve, or if desired the roller may be fitted with a removable sleeve when originally constructed.

Having thus described my invention, what I claim is:

A printing roller consisting of a shaft, a core mounted thereon having its ends tapered and an elastic rubber covering frictionally and removably held to said core, the end portions of said covering fitting snugly on the tapered ends of said core and terminating short of the ends of the latter whereby to prevent casual longitudinal movement of the covering the elasticity of the covering being the only means of securing said cover to said core.

ERNEST J. SMITH.